E. F. WALDO.
FLY TRAP.
APPLICATION FILED JUNE 18, 1915.
1,188,224.
Patented June 20, 1916.
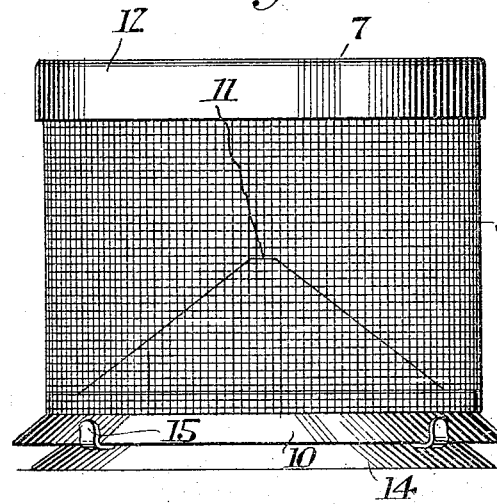
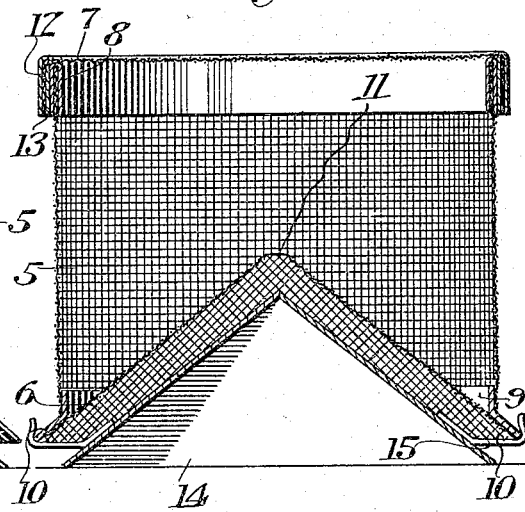
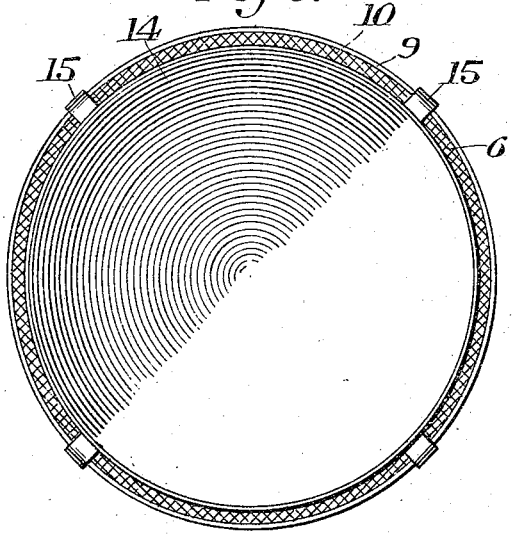
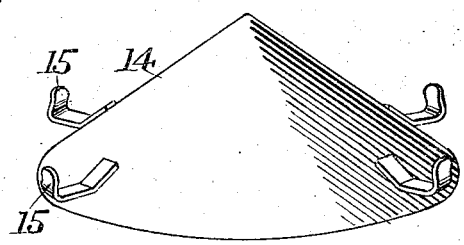
Witnesses
Inventor
E. F. Waldo
By Victor J. Evans
Attorney

UNITED STATES PATENT OFFICE.

EDMUND F. WALDO, OF SONYEA, NEW YORK.

FLY-TRAP.

1,188,224.  Specification of Letters Patent.  Patented June 20, 1916.

Application filed June 18, 1915. Serial No. 34,916.

*To all whom it may concern:*

Be it known that I, EDMUND F. WALDO, a citizen of the United States, residing at Sonyea, in the county of Livingston and State of New York, have invented new and useful Improvements in Fly-Traps, of which the following is a specification.

The present invention relates to improvements in traps, and has particular application to that class of devices designed for trapping flies or insects of a similar character, wherein use is made of a receptacle having a cone-shaped bottom projecting upwardly within the receptacle, and provided with an entrance opening at the apex thereof.

It is the primary object of this invention to combine with an article of the above mentioned character, a cone-shaped member fitted within the cone-shaped bottom and spaced therefrom to provide a passage for the insects, the member in addition to providing a bait holder being especially advantageous in guiding the insects toward the opening in the cone-shaped bottom, and as it is instinctive with the fly to proceed upwardly, his ultimate destination is in the trap.

Among other features the invention embodies simplicity in construction, durability, and one wherein the parts can be readily and easily assembled or disassembled when desired.

In the drawing forming part of this application like numerals of reference indicate similar parts in the several views and wherein:

Figure 1 is a side elevation of the trap constructed in accordance with my invention. Fig. 2 is a vertical sectional view therethrough. Fig. 3 is a bottom plan view. Fig. 4 is a detail perspective view of the cone-shaped member.

The trap forming the subject matter of my invention may be constructed from any suitable material, desired size or configuration, and comprises a body 5 preferably constructed from wire of suitable mesh, and of cylindrical formation, a bottom 6 and closure 7. Surrounding the upper edge of the body 5 is a reinforcing band 8, secured thereto in any suitable manner, while the lower edge of the material forming the body is secured to a reinforcing band 9 having an outward flared portion 10, to the under side of which is secured the material forming the bottom 6. The bottom is also preferably constructed from suitable foraminated material, being cone-shaped and extending upwardly an appreciable distance within the body 5 and provided with a restricted opening 11 at the apex thereof. While the bottom 6 is shown as being constructed from a separate piece of foraminated material, it may, if desired be formed from the same material constituting the body 5. The closure 7 comprises a sheet of foraminated material having its marginal edge clamped between two concentrically disposed rings 12 and 13 respectively, the latter adapted to embrace the reinforcing band 8 when operatively associated with the body 5.

Extending within the bottom 6 is a cone-shaped member preferably constructed from tin, to the upper surface of which adjacent its lower edge is secured spring clips 15, the latter being disposed at diametrically opposite points and adapted to snap over the flared portion of the reinforcing band 9 on the body 5 of the receptacle, the clips 15 serving to maintain the cone-shaped member operatively associated with the bottom 6 and equidistantly spaced therefrom. The space between the bottom 6 and the cone-shaped member 14 provides an entrance passage for the flies or other insects, which are attracted to the trap by the bait (not shown) which covers the entire upper surface of the cone-shaped member 14, and may be of the nature of sliced fruit, or any other suitable substance. The member 14 serves to guide the flies or other insects toward the opening 11 in the bottom 6, and as it is instinctive with flies to proceed upwardly, the latter will pass through the opening 11, his ultimate destination being within the body portion 5, and trapped therein. When a sufficient number of insects have been trapped within the body portion 5, they may be destroyed in any suitable manner such as, for instance, submerging the trap in its entirety in water, after which the closure 7 will be removed and the lifeless insects removed.

By reason of the construction hereinabove described, it will be manifest that the closure 7 as well as the cone-shaped member 14 may be quickly and easily removed from the body 5 when desired for the purpose of cleansing the trap.

I do not claim as my invention a trap wherein the bottom is cone-shaped extending upwardly within the body portion, as I am well aware of the fact that these traps have been in use and very capable of capturing a large number of insects, but tests have proven that the addition of the cone-shaped member 14, and its operative association with a trap of this character increases the efficiency of the trap manyfold.

It is therefore believed from the foregoing description that the nature and advantages of the invention will be thoroughly understood without requiring a more extended explanation and therefore the same has been omitted.

What is claimed is:—

A fly trap comprising a vertical foraminous cylindrical open end body, a closure covering the upper end thereof, a cone-shaped deflector arranged in the bottom end of said body clips secured to said deflector at spaced intervals, a cone-shaped bottom member resting at its edge on said clips, and a band substantially V-shaped in cross section with one edge portion extending vertically and abutting the bottom edge portion of said body and its opposite edge portion arranged at an angle so as to lie in flat contact with the edge portion of said bottom member and abutting said clips.

In testimony whereof I affix my signature in presence of two witnesses.

EDMUND F. WALDO.

Witnesses:
 WILLIAM C. COOPER,
 JEANIE L. KLECKLER.

Copies of this patent may be obtained for five cents each, by addressing the "Commissioner of Patents, Washington, D. C."